US007697674B2

(12) United States Patent
Nassimi

(10) Patent No.: US 7,697,674 B2
(45) Date of Patent: Apr. 13, 2010

(54) GATE INTERCOM WITH A WIRELESS TELEPHONY INTERFACE

(75) Inventor: Shary Nassimi, Malibu, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 1181 days.

(21) Appl. No.: 11/163,494

(22) Filed: Oct. 20, 2005

(65) Prior Publication Data

US 2010/0015930 A1 Jan. 21, 2010

(51) Int. Cl.
*H04M 1/60* (2006.01)
*H04M 9/00* (2006.01)

(52) U.S. Cl. ............. 379/167.02; 379/160; 379/167.05; 455/554.2; 455/556.1

(58) Field of Classification Search .............. 379/93.05, 379/93.09, 93.14, 93.17, 93.23, 93.28, 102.01, 379/102.02, 102.06, 142.01, 142.13, 159–160, 379/164, 166; 455/3.01, 3.03, 3.05, 3.06, 455/14–15, 41.02, 68, 62, 420, 554.2, 556.1, 455/569.1
See application file for complete search history.

(56) References Cited

U.S. PATENT DOCUMENTS 3,917,911 A * 11/1975 Lesher .................. 379/102.06
5,035,082 A * 7/1991 Butler .......................... 49/334
5,406,617 A * 4/1995 Bauer .......................... 455/462
6,760,419 B1 * 7/2004 Brown et al. ................ 379/159
7,304,572 B2 * 12/2007 Sheynman et al. ..... 340/539.14
7,567,659 B2 * 7/2009 Kumagai .................... 379/159
2005/0135584 A1 * 6/2005 Thomas ................. 379/167.01
2005/0267605 A1 * 12/2005 Lee et al. ....................... 700/19
2007/0064897 A1 * 3/2007 Lee ............................ 379/159
2008/0079562 A1 * 4/2008 Gioia et al. ................. 340/531

* cited by examiner

*Primary Examiner*—Binh K Tieu
(74) *Attorney, Agent, or Firm*—Fitch Even Tabin & Flannery

(57) ABSTRACT

The present invention is directed to a telephony communication interface device. The device includes a communication transceiver configured to communicate with a remote system via a predetermined communication channel. A control circuit is coupled to the communication transceiver. The control circuit is configured to determine a device operating mode status based on communication transceiver activity. The device operating mode status includes a telephonic communications mode and a remote system communications mode. An interface circuit is coupled to at least one telephone set. The interface circuit is configured to propagate voice telephony signals between the at least one telephone set and a telephony network in a telephonic communications mode and propagate voice intercom signals between the at least one telephone set and the communication transceiver in the remote system communications mode.

2 Claims, 3 Drawing Sheets

GATE INTERCOM WITH A WIRELESS TELEPHONY INTERFACE

BACKGROUND OF THE INVENTION

Field of the Invention

The present invention relates generally to security systems, and particularly to security gates having an intercom.

TECHNICAL BACKGROUND

Security gates are used control the ingress and egress to residential areas, individual residences, corporate and institutional areas, military bases, and other such controlled areas. Security gates may be operated in a variety of ways. However, the present invention is directed to gate systems that employ a gate intercom for user access. In other words, a visitor to a controlled area speaks to person inside the controlled space before being allowed to enter. Once permission is granted, a gate opening signal is generated. Gate closure may be effected after a predetermined time delay, or in response to a gate closure signal. The gate closure signal may be generated using any suitable manner.

As noted above, gate systems typically require that a person inside the controlled area be notified when a visitor seeks access to the controlled area. The person is typically notified by a communication channel that includes an electrically wired propagation path, for example, from a gate intercom to an intercom device disposed in the controlled area. The intercom inside the controlled space is typically a component of a communication and control system that provides the user with the ability to receive calls from the gate intercom, speak with the visitor, and control the gate from inside the controlled space.

In one approach that has been considered, wiring is disposed between the gate intercom and an interface to the home telephony wiring. The intercom wiring may be connected to an interface allowing the user to communicate with the gate intercom via the telephone. One drawback to this approach relates to the expense and, in some cases, the difficulty of placing the wiring between the gate and the controlled area. Thus, in another approach that has been considered, a radio system is employed to link the gate intercom with the controlled area. However, this approach also has drawbacks in that each side of the radio link must employ a radio transceiver. As such, the controlled area must be equipped with both a telephone set for normal telecommunications activity, and a radio transceiver to communicate with the gate intercom.

Accordingly, what is needed is a wireless gate intercom interface that allows a user in a controlled area to use a standard (POTS) telephone to converse with a visitor at the security gate over a radio channel. What is also needed is a way for the user in a controlled area to use a standard (POTS) telephone to control gate operations over the radio channel.

SUMMARY OF THE INVENTION

The present invention addresses the needs described above. The present invention is directed to a wireless gate intercom interface that allows a user in a controlled area to use a standard (POTS) telephone to converse with a visitor at the security gate over a radio channel. The present invention also allows the user to use a standard (POTS) telephone to control gate operations over the radio channel.

One aspect of the present invention is directed to a telephony communication interface device. The device includes a communication transceiver configured to communicate with a remote system via a predetermined communication channel. A control circuit is coupled to the communication transceiver. The control circuit is configured to determine a device operating mode status based on communication transceiver activity. The device operating mode status includes a telephonic communications mode and a remote system communications mode. An interface circuit is coupled to at least one telephone set. The interface circuit is configured to propagate voice telephony signals between the at least one telephone set and a telephony network in a telephonic communications mode and propagate voice intercom signals between the at least one telephone set and the communication transceiver in the remote system communications mode.

In another aspect, the present invention is directed to an intercom telephone interface device for use in a security gate (i.e., secured entry/exit) system. The device includes a communication transceiver configured to accommodate two-way communications with the security gate system via a predetermined communication channel. A control circuit is coupled to the communication transceiver. The control circuit is configured to determine a device operating mode status based on call origination data. The device operating mode status includes a telephonic communications mode and a gate intercom mode. An interface circuit is coupled to the control circuit. The interface circuit is configured to propagate voice telephony signals between the at least one telephone set and a telephony network in a telephonic communications mode and propagate voice intercom signals between the at least one telephone set and the communication transceiver in the gate intercom mode.

In yet another aspect, the present invention is directed to a security system that includes a security gate apparatus. The gate apparatus includes a gate intercom. A gate transceiver is coupled to the gate intercom. The gate transceiver is configured to transmit electrical voice input signals over a predetermined wireless communication channel and receive electrical voice output signals and gate control commands from the predetermined communication channel. A gate control unit is configured to generate gate control signals in response to gate control commands. The security system also includes an intercom/telephone interface device that includes a communication transceiver configured to communicate with the gate transceiver via the predetermined communication channel. A control circuit is coupled to the communication transceiver. The control circuit is configured to determine a device operating mode status based on call origination data. The device operating mode status includes a telephonic communications mode and a gate intercom mode. An interface circuit is coupled to the control circuit. The interface circuit is configured to propagate voice telephony signals between the at least one telephone set and a telephony network in a telephonic communications mode and propagate voice intercom signals between the at least one telephone set and the communication transceiver in the gate intercom mode.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
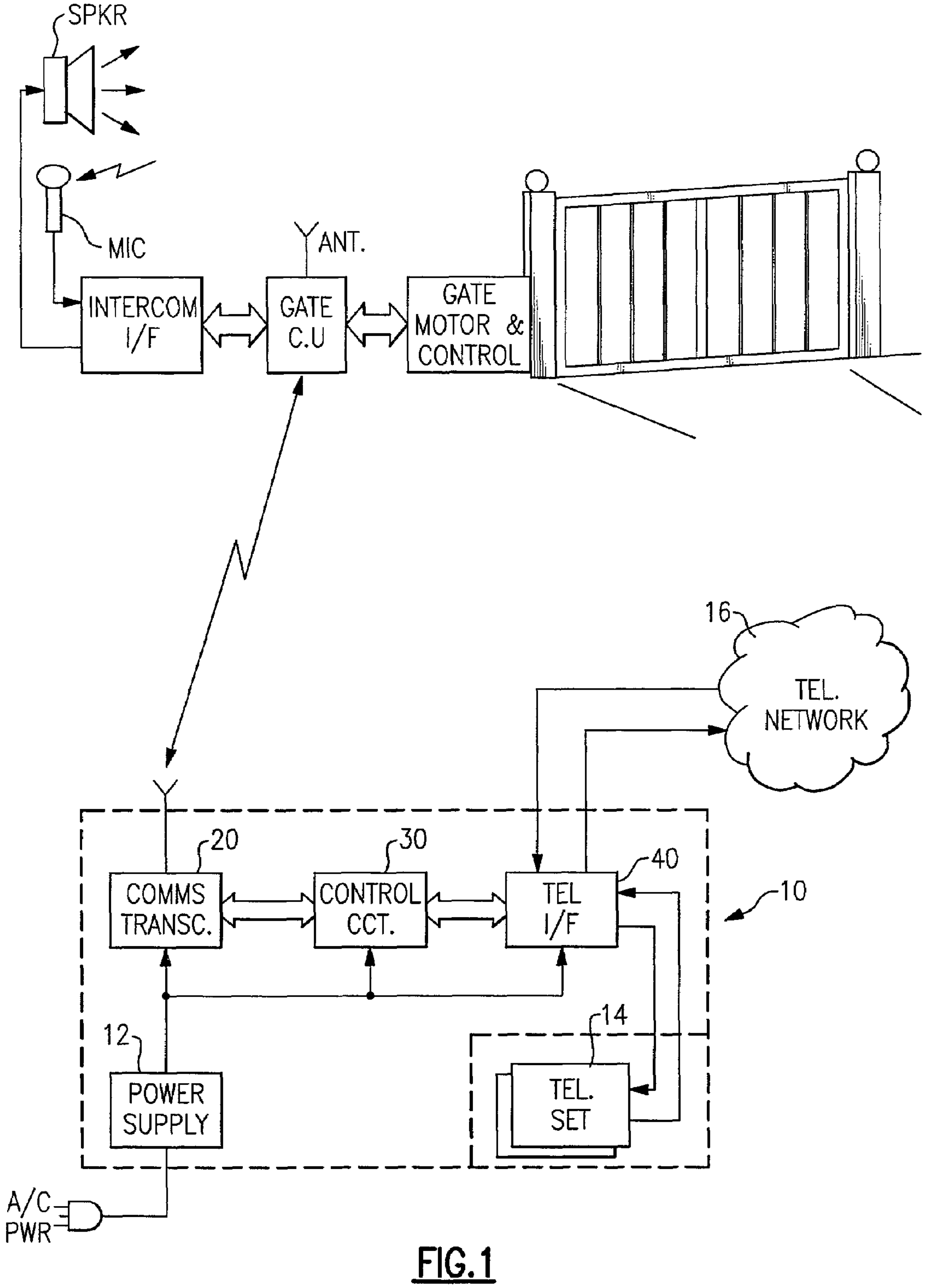
FIG. 1 is a system block diagram in accordance with the present invention.

Reference will now be made in detail to the present exemplary embodiments of the invention, an examples of which are illustrated in the accompanying drawings. Wherever possible, the same reference numbers will be used throughout the drawings to refer to the same or like parts. An exemplary embodiment of the Intercom Telephony Interface (ITI) device of the present invention is shown in FIG. 1, and is designated generally throughout by reference numeral 10.

As embodied herein, and depicted in FIG. 1, a system block diagram of the Intercom Telephone Interface (ITI) device 10 is depicted. ITI 10 includes a communication transceiver 20 that is configured to communicate with the gate control unit by way of a radio/wireless channel. The gate system includes a gate motor control unit to open and close the gate and an intercom interface that controls the microphone and speaker unit used by the visitor seeking gate access.

Referring back to ITI 10, a control circuit 30 is coupled to the communication transceiver 20. The control circuit 30 determines an operating mode status based on call origination data. ITI 10 operating mode status includes a telephonic communications mode and a remote system communications mode. ITI 10 also includes an interface circuit 40 that is coupled to control circuit 30 and the user telephone set 14, which is usually disposed in the controlled area. In the telephonic communications mode, interface circuit 40 enables "normal" telephone set usage, that is, it provides a telephonic connection between the telephone set and the telephony network. In an intercom communication mode, the interface circuit 40 couples the telephone set to the communication transceiver 20, such that voice intercom signals are propagated between the telephone set and the communication transceiver.

ITI 10 also includes a power supply 12 configured to provide each component (20, 30, 40) of device 10 with appropriate power signals. Power supply 12 includes an A/C power plug that is configured to be inserted into a standard receptacle. Of course, the power supply 12 may be adapted to conform to U.S., Canadian, European, or other such electrical power transmission standards.

Those skilled in the art will understand that the present invention may accommodate one or more telephone sets. As shown by the placement of the dotted line around the telephone set, in one embodiment of the present invention, ITI 10 includes a standard telephone incorporated therein. This embodiment is advantageous because it eliminates an external connection between the interface 40 and the telephone set. The user merely inserts the telephonic cable into a telephone jack disposed in the device 10 housing, and inserts the plug from power supply 12 into an A/C power source, i.e., a wall receptacle.

Figure 2:
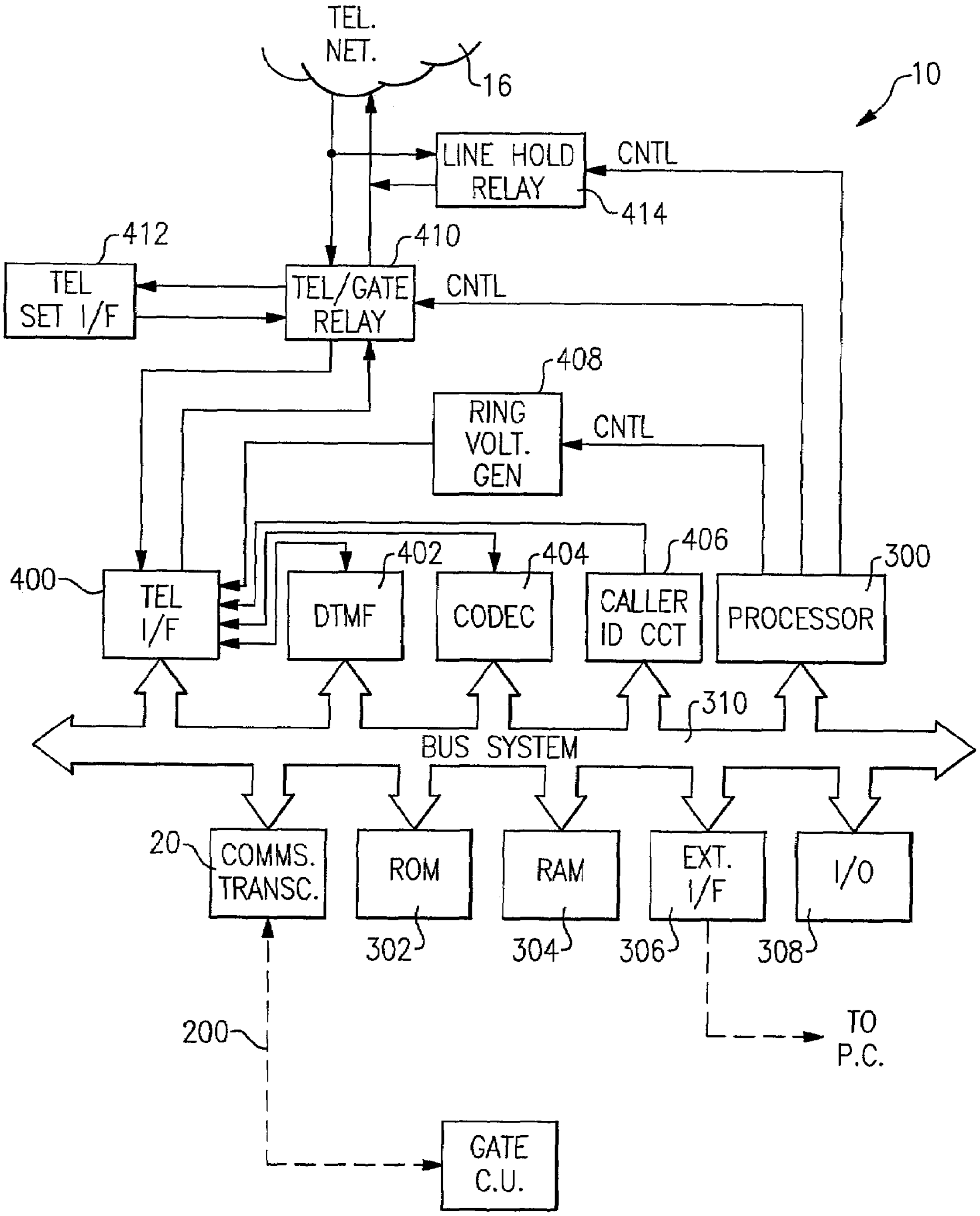
FIG. 2 is a diagrammatic depiction of an Intercom Telephony Interface (ITI) in accordance with one embodiment of the present invention.

Referring to FIG. 2, a detailed diagram of ITI 10 in accordance with one embodiment of the present invention is disclosed. ITI 10 includes processor 300, read only memory (ROM) 302, random access memory (RAM) 304, external interface 306, and I/O circuit 308 coupled together by way of bus system 310. Bus 310 also supports telephone interface circuit 400, DTMF transceiver 402, codec 404, and caller ID circuit 406. The caller ID circuit may also include a call waiting circuit incorporated therein.

Those of ordinary skill in the art will understand that telephone interface 400 provides proper impedance matching to the telephone line such that telephonic voice signals are efficiently propagated between ITI 10 and the telephony network without significant losses or reflections. Telephony interface 400 may be implemented, for example, by an integrated circuit coupled to suitable isolation transformers. Interface circuit 400 is also configured to convert signals provided to the telephony network into signals having a correct format and amplitude for transmission to the public switched telephone network (PSTN) Central Office. The reverse is true as well. Telephone interface 400 may also include a buffer amplifier and an adjustable potentiometer to provide optimal signal levels.

Telephony/gate relay mechanism 410 is configured to switch between operating modes under the control of processor 300. In a telephonic communication mode, relay 410 allows voice telephony signals to propagate between the telephone set 14 and the telephony network 16. In the gate intercom communications mode, relay 410 propagates voice intercom signals between telephone set 14 and the communication transceiver 20, by way telephony interface 400 and bus 310. Relay 410 is shown in greater detail in FIG. 3. Telephony/gate relay mechanism 410 is shown as being coupled to a telephone set interface 412.

In a wireline embodiment, interface 412 may simply represent the input jack of telephone set 14. On the other hand, telephone set 14 may be a wireless telephone. In this implementation, telephone set interface 412 supports the wireless telephony channel between interface 412 and the telephone set 14.

Line hold relay 414 is used to place a load on the telephone line to thereby mimic an off-hook condition. Thus, if a user inside the controlled space is on a telephone call, the remote caller may be placed on hold while the user attends to a visitor at the gate. Once the visitor is processed, the user may return to his/her conversation. Relay 414 is shown in greater detail in FIG. 4.

Those skilled in the art will also understand that DTMF (dual tone multi-frequency) transceiver 402 generates and detects audible tones associated with the telephone network. In the present invention, DTMF 402 is configured to transmit gate control commands to the gate control unit (See FIG. 1). The DTMF transceiver may also be configured to detect status information provided by the gate control unit. Further, the presence of DTMF signaling from the telephony network may be employed by processor 300, via DTMF transceiver 402, as a means for determining the operational mode of device 10. Those of ordinary skill in the art will understand that processor 300, DTMF 402, Codec 404, and CID 406 may also be configured to perform traditional telephonic call handling functions if telephone set 14 is incorporated into ITI device 10.

It will be apparent to those of ordinary skill in the pertinent art that modifications and variations can be made to codec transceiver 404. For example, codec 404 may employ a standard telephonic digitization scheme to band limit voice frequencies to the 300-3300 Hz frequency band. In this implementation, codec 404 may perform an A/D conversion of an analog voice message using a μ-law companding scheme. For example, when sampling the analog waveform, larger amplitudes are compressed relative to the smaller amplitudes, providing an equivalent 12-bit accuracy within an 8-bit digital word. The 8-bit words generated by codec 404 can be stored in RAM 304, or in a memory resident in processor 300.

Those of ordinary skill in the art will recognize that Caller ID circuit 406 may be of any suitable type. For example, circuit 406 may be implemented using a single CID receiver chip. CID receiver chip 406 may be implemented as an integrated circuit that includes an A/D converter, a CID detection circuit, a gain adjusting circuit, a demodulator, and a serial-to-parallel buffer. The detection circuit in CID circuit 406 detects a channel seizure waveform signaling that a CID mark signal will follow. After synchronizing with the mark signal, CID circuit 406 receives a CID data packet that may include CID information such as telephone number, name, date, time, and error correction information if the in-coming call is from the telephony network. If the call is from the gate intercom, the CID packet data will identify the call as such. After extracting the CID data, the serial-to-parallel buffer converts the CID data into digital words suitable for transmission on system bus 310. CID 406 may also incorporate caller waiting functionality as well.

Processor 300 may be implemented using an off-the-shelf microprocessor such as a Pentium processor manufactured by Intel, a DSP manufactured by Motorola, or any suitable processing circuit depending on the sophistication of the implementation. Those of ordinary skill in the art will also recognize that processor 20 can also be implemented using application specific integrated circuits (ASIC), or a combination of off-the-shelf processors and ASICs in the design. Processor 300 is programmed to support conventional call handling functions and also determines the device operating mode status in response to CID data. As noted above, the device operating mode status includes a telephonic communications mode and a remote system communications mode. As noted above, processor 300 signals relay 410 to switch between modes.

ITI system 10 also includes a ring voltage generator 408. Generator 408 is likewise under the control of processor 300. If processor 300 determines that an incoming call is from the telephony network, a first ring voltage having a distinctive cadence is transmitted to generator 408. The ringing cadence notifies the user that the call is a normal telephone call. If processor 300 determines that the call is coming from the gate intercom a second distinctive pattern is transmitted to ring generator 408. Of course, this pattern signals the user that the call is coming from the gate.

ITI system 10 also includes read/write random access memory (RAM) 304 which is employed during data processing and data I/O functions. A programmable read only memory (ROM) 302 is also used to store programming instructions and database information used by processor 300. One of ordinary skill in the art will recognize that ROM 302 may be implemented using a DRAM, PROM, EROM, EPROM, $E^2$PROM, a hard drive, diskettes, a compact disk device, or any other suitable computer readable medium.

ITI system 10 may also include an external peripheral interface 306. Interface 306 is configured to communicate with an external computing device such as a personal computer (PC). Those of ordinary skill in the art will understand that a PC may be employed by personnel within the controlled area to control ITI 10 and the gate system remotely. The PC may also be used to collect call and visitor data as needed. The PC may also be coupled to a local area network (LAN) or a wide area network (WAN).

I/O circuit 308 may be employed to support one or more data entry and display devices. Thus, caller ID information, or any of the data stored on the PC may be accessed via a display device. Similarly, system control data may be transmitted to ITI 10 by way of the data entry devices. The display may be of any suitable type, such as a liquid crystal display capable of displaying CID information, dialing information, memory contents, menu information, programming instructions, or any other suitable information that can be displayed. The data entry devices may be implemented using a telephone set twelve-key dialing device, a function key set, a keyboard for data entry and programming functions, and/or a mouse. The I/O circuit may also support a speaker and a microphone. This embodiment provides a great deal of flexibility in that the personnel inside the controlled area may converse with a visitor at the gate using either the telephone set 14 or the speaker and microphone coupled to the PC/workstation.

Figure 3:
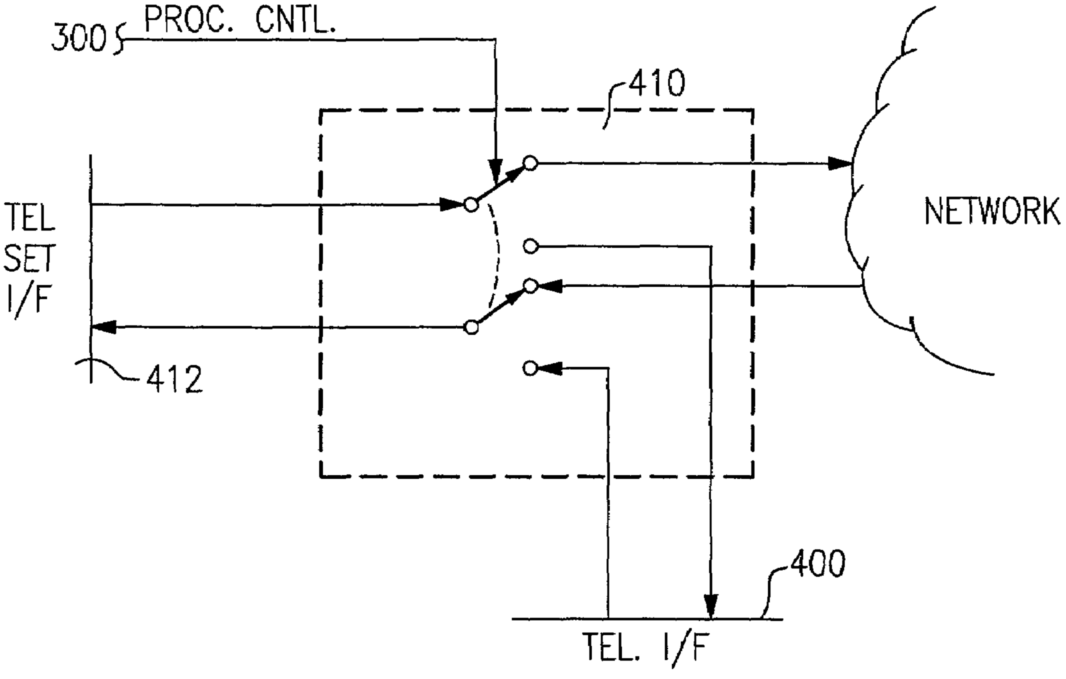
FIG. 3 is a detailed diagram of the telephone/gate mode relay depicted in FIG. 1.

As embodied herein and depicted in FIG. 3, a detailed diagram of the telephone/gate mode relay 410 is shown. In one embodiment, interface 410 is configured as a double pole, double throw (DPDT) switch. Those of ordinary skill in the art will understand that relay 410 may be implemented as a mechanical relay or as an electrical relay system. Relay 410 is normally set in the telephonic communication mode such that the telephone set 14 is coupled to the PSTN central office. Processor 300 may switch the mode to the gate intercom mode in response to a call from the gate, a telephone set keypad entry, an input from the external interface 306, or by way of any suitable call origination means.

Figure 4:
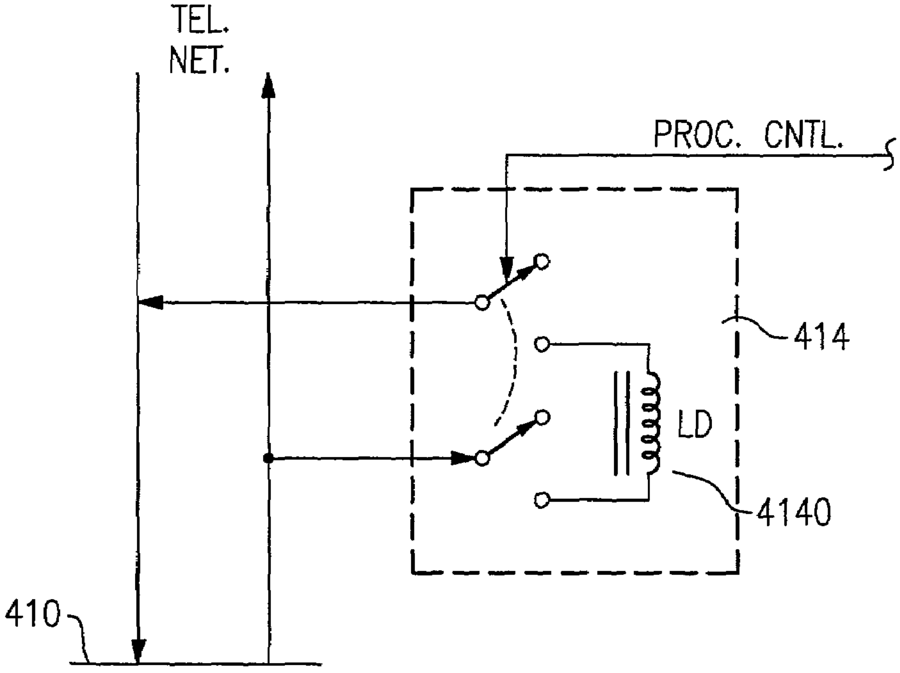
FIG. 4 is a detailed diagram of the line hold relay depicted in FIG. 1.

Referring to FIG. 4, a detailed diagram of the line hold relay 414 is shown. Line hold relay 414 may also be configured as a DPDT switch. In telephonic communication mode, relay 414 is open circuited. In gate intercom mode, processor 300 may coupled the telephone line to load 4140 to simulate an off-hook condition. As described above, processor 300 transmits the switching signal when the user places a caller on hold to speak with a visitor via the gate intercom. Once the visitor is processed, the user takes the caller off hold and processor 300 removes load 4140 from the telephone line.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A security system comprising:

a secured entry apparatus comprising, an intercom, a transceiver coupled to the intercom, the transceiver being configured to transmit electrical voice input signals over a wireless communication channel and receive electrical voice output signals and control commands from the communication channel, and a control unit configured to generate control signals in response to control commands; and an intercom/telephone interface device comprising, a communication transceiver configured to communicate with the transceiver via the communication channel, a control circuit coupled to the communication transceiver, the control circuit being configured to determine a device operating mode status based on call origination data, the device operating mode status including a telephonic communications mode and an intercom mode, and an interface circuit coupled to the control circuit, the interface circuit being configured to propagate voice telephony signals between the at least one telephone set and a telephony network in a telephonic communications mode and propagate voice intercom signals between the at least one telephone set and the communication transceiver in the gate intercom mode.

2. The system of claim 1, wherein the control circuit is configured to generate the control commands in accordance with inputs received from the at least one telephone set.

* * * * *